United States Patent
Ludwig

(10) Patent No.: US 8,707,783 B2
(45) Date of Patent: Apr. 29, 2014

(54) SENSOR HOUSING COVER AND METHOD FOR MANUFACTURING SUCH A SENSOR HOUSING COVER

(75) Inventor: Ronny Ludwig, Bodelshausen (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 13/002,130

(22) PCT Filed: May 5, 2009

(86) PCT No.: PCT/EP2009/055373
§ 371 (c)(1),
(2), (4) Date: Mar. 29, 2011

(87) PCT Pub. No.: WO2010/000526
PCT Pub. Date: Jan. 7, 2010

(65) Prior Publication Data
US 2011/0174071 A1    Jul. 21, 2011

(30) Foreign Application Priority Data

Jul. 3, 2008 (DE) .......................... 10 2008 040 155

(51) Int. Cl.
G01D 11/24 (2006.01)
G01L 19/14 (2006.01)
G01P 1/02 (2006.01)

(52) U.S. Cl.
USPC .......................................................... 73/431

(58) Field of Classification Search
USPC ................... 73/431, 855, 204.22; 340/693.6, 340/693.12; 264/259, 464, 514, 539
See application file for complete search history.

(56) References Cited

U.S. PATENT DOCUMENTS

| | | | | |
|---|---|---|---|---|
| 3,266,312 A * | 8/1966 | Coleman et al. | | 73/313 |
| 4,312,123 A * | 1/1982 | Wheeler | | 29/887 |
| 5,700,360 A * | 12/1997 | Chan et al. | | 205/778 |
| 5,872,307 A * | 2/1999 | Brammer et al. | | 73/35.11 |
| 6,647,793 B2 * | 11/2003 | Dirmeyer et al. | | 73/700 |
| 7,380,458 B1 | 6/2008 | Date et al. | | |
| 7,454,976 B2 * | 11/2008 | Wanami et al. | | 73/730 |
| 7,568,393 B2 * | 8/2009 | Adam et al. | | 73/715 |
| 7,776,987 B2 * | 8/2010 | Oswald et al. | | 526/352.2 |

FOREIGN PATENT DOCUMENTS

| | | |
|---|---|---|
| DE | 10 2006 040665 | 3/2007 |
| DE | 10 2006 018031 | 10/2007 |
| JP | 2-107416 | 4/1990 |
| JP | 2002-55010 | 2/2002 |
| JP | 2005-308666 | 11/2005 |

OTHER PUBLICATIONS

Author: unknown, Title: Plastics, Publisher: Penton Business Media, Inc. and Penton Media, Inc. Publication: Machine Design, date: Jun. 1994, vol. 66, Issue: 12, pp. 22 including bib sheet.*

* cited by examiner

*Primary Examiner* — Lisa Caputo
*Assistant Examiner* — Roger Hernandez-Prewitt
(74) *Attorney, Agent, or Firm* — Kenyon & Kenyon LLP

(57) ABSTRACT

A sensor housing cover and a method for manufacturing such a sensor housing cover are described. The sensor housing cover is made up of a base cover having at least one opening. The base cover is extrusion-coated with a first plastic in such a way that the first plastic constitutes at least one element of the sensor housing cover and is positively connected to the base cover via the at least one opening. In the manufacturing process, the base cover is provided and then enclosed by a mold. The first plastic is injected into the mold to manufacture the at least one element of the sensor housing cover.

15 Claims, 3 Drawing Sheets

SENSOR HOUSING COVER AND METHOD FOR MANUFACTURING SUCH A SENSOR HOUSING COVER

FIELD OF THE INVENTION

The present invention relates to a sensor housing cover and a method for manufacturing such a housing cover.

BACKGROUND INFORMATION

The installation of an air pressure sensor in a side component of a vehicle in order to detect a side collision using an increase in air pressure occurring in the side component is discussed in German patent document DE 10 2006 018 031 A1.

SUMMARY OF THE INVENTION

In contrast, the sensor housing cover according to the present invention and the method according to the present invention for manufacturing such a housing cover having the features of the main claims have the advantage that the sensor housing cover is made up from only a base cover and an extrusion-coated plastic, the connection between the extrusion-coated plastic and the base cover being achieved by a positive connection via at least one opening. This reduces the number of different materials to two and the positive connection avoids adhesion problems between the base cover and the extrusion-coated plastic. In particular when the present invention is used for an air pressure sensor, the number of material transitions is reduced, thus minimizing the probability of a leak when such an air pressure sensor is screwed to a mounting plate in the door.

This simple design results in a cost reduction. The extrusion-coated plastic may also assume the function of a seal. This reduces possible problem points.

The method according to the present invention may be implemented as a simple injection molding process. Final assembly processes are eliminated, resulting in turn in a cost reduction.

In the present instance, the sensor housing cover is provided for sealing a sensor housing. This sensor housing cover is designed according to the present invention.

According to the exemplary embodiments and/or exemplary methods of the present invention, the base cover, which may be designed according to the dependent claims, has at least one opening so that the extrusion-coated plastic is joined to the base cover by a positive connection.

The plastic suitable for the injection molding process may be designed according to the dependent claims, thus clarifying the selection of the term "extrusion coating." In particular, the extrusion coating makes it possible for the first plastic to constitute at least one element of the sensor housing cover. To that end, a mold is provided in the manufacturing process that makes it possible to create this element and manufacture it using injection molding. The element is defined according to the dependent claims.

The at least one opening may have extremely diverse embodiments depending on the sensor type used. In an air pressure sensor, the at least one opening is intended for implementing the pressure inlet channel.

"Providing" in the method for manufacturing the sensor housing cover of the base cover means that the base cover is either manufactured or purchased, so that the base cover is already present.

The mold may assume extremely diverse embodiments, for example a two-piece mold. It is in particular possible to provide an upper and a lower mold, which are then sealed to be leakproof. Furthermore, it is possible to provide slides that are extended until they make contact in order to define the pressure inlet channel in the injection molding process. The pressure inlet channel is normally angled. After cooling, these slide elements or slides are refracted and the upper and lower molds are opened, resulting in manufacture of the sensor housing cover.

The measures and enhancements recited in the dependent patent claims permit advantageous refinements of the sensor housing cover and the method for manufacturing such a sensor housing cover specified in the independent patent claims.

It is advantageous that the base cover is essentially made of a hydrolysis-stabilized plastic. In such a hydrolysis-stabilized plastic, the plastics are chemically altered to make them resistant to alkaline solutions. Commercially available plastics such as PBT GF30 may be used as the housing plastic for interior applications, for example Ultradur B4300 from BASF. If the sensors are used in locations subject to the effects of weather, for example as so-called upfront sensors which are used in the front of the vehicle as crash sensors, hydrolysis-stabilized PBT GF30 may be used, for example Crastin-CE 2510 or Raditer B IRV 4008 TKB381. It is problematic, however, that polybutylene terephthalate (PBT) may be broken down chemically by hydrolysis by water and moist heat at 60° C. and higher. This storage behavior may be improved by appropriate stabilization. A special chemical modification makes this possible. This effect is quantitative and gradual, making a basic change of the behavior impossible because the ester groups in the molecular structure of PBT represent a weak point.

Furthermore, it is advantageous that the base cover is a one-piece design, which contributes to a simple manufacturing process in particular.

It is furthermore advantageous that a first opening is provided for a pressure inlet channel and two additional openings are provided for the positive connection, the first opening being larger than the two additional openings. If the number of additional openings is increased, this positive connection may be improved even more.

Advantageously, the first plastic is silicone which is very suitable for the injection molding or extrusion coating. The first plastic, the silicone for example, may also be a one-piece design so that only a two-piece sensor housing cover is present, which results in manufacturing and cost benefits.

Advantageously, the at least one element is an inner seal to the sensor. This is in particular of advantage for the air pressure sensor. However, the at least one element may also be the pressure inlet channel, as already described above, and/or an external seal, for example to the door metal plate.

Exemplary embodiments of the invention are depicted in the drawing and will be explained in greater detail in the following description.

DETAILED DESCRIPTION

Figure 1A:
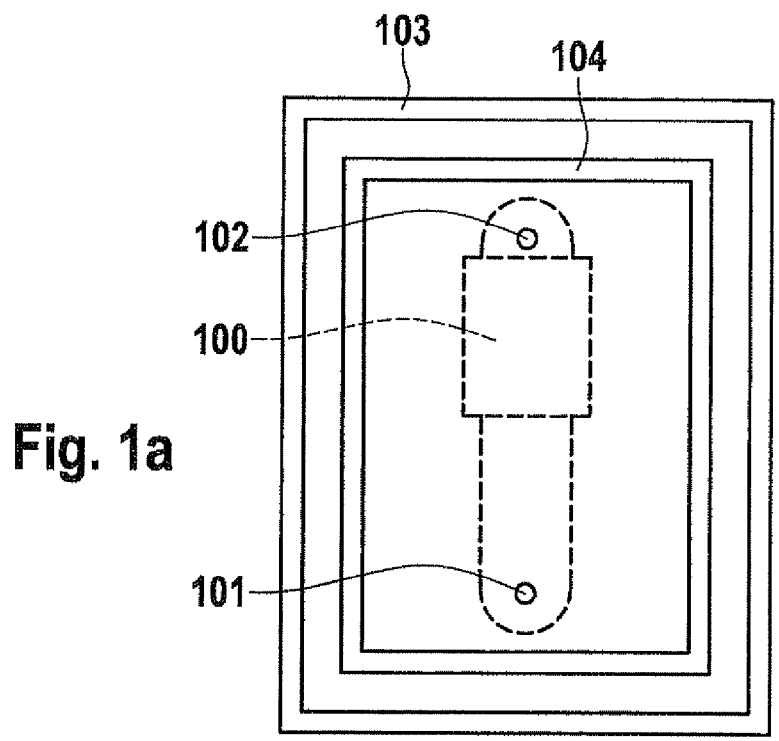
FIG. 1a shows a view of an air pressure sensor according to the present invention.

FIG. 1a shows the sensor housing cover from below. Webs 103 and 104 and openings 101 and 102 which are used for the positive connection are visible. Silicone, which is depicted by a dashed line in contrast to the solid lines of the hydrolysis-stabilized plastic, is depicted as the extension surrounding openings 101 and 102 for the positive connection and also the definition of pressure inlet channel 100.

Figure 1B:
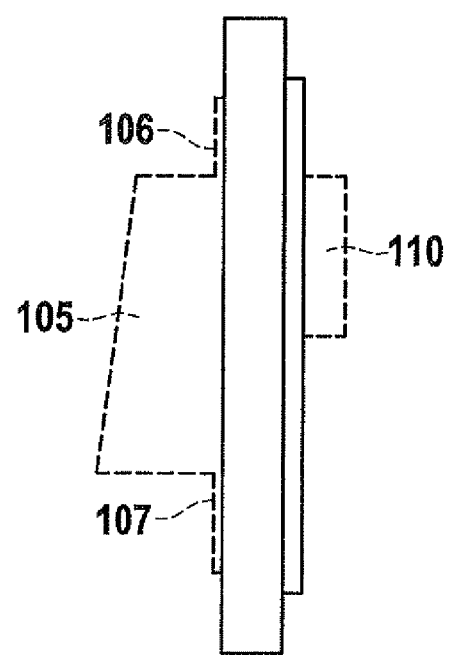
FIG. 1b shows another view of an air pressure sensor according to the present invention.

FIG. 1b shows a side view of the sensor housing cover. Again, the base cover with the hydrolysis-stabilized plastic is depicted by the solid lines. Silicone, which is depicted by dashed lines, defines pressure inlet channel 105 and extensions 106 and 107 in order to implement the positive connection through holes 101 and 102. Furthermore, the definition of pressure inlet channel 110 into the interior of the sensor is visible.

Figure 1C:
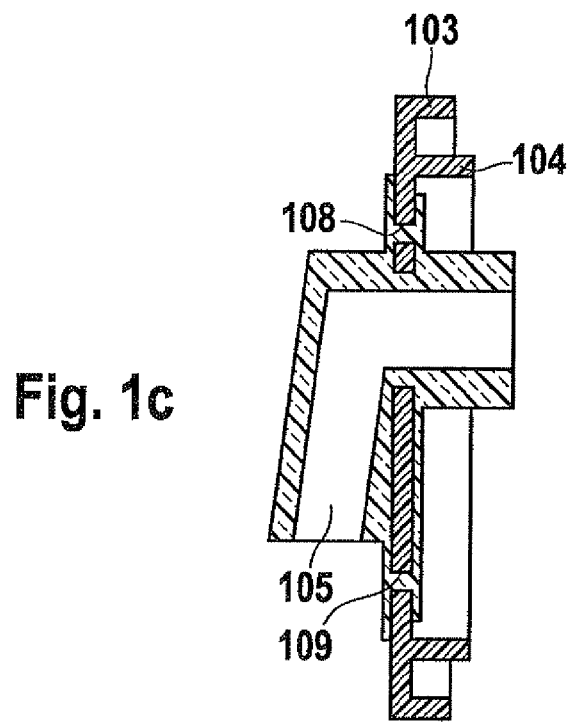
FIG. 1c shows another view of an air pressure sensor according to the present invention.

FIG. 1c shows the sensor housing cover in cross section. The base cover is depicted by close slanting hatched lines, the hatching being drawn from bottom left to top right, while the silicone as the extrusion-coated plastic is also depicted by slanting hatched lines but less close and drawn from bottom right to top left. Pressure inlet fitting 105 defined by the silicone is again visible. The silicone is a one-piece design in this case and it produces the positive connection with the base cover through openings 101 and 102 with material parts 108 and 109. The webs of the base cover are also depicted as 103 and 104. The definition of the pressure inlet channel into the interior of the sensor and the seals are also shown.

Figure 1D:
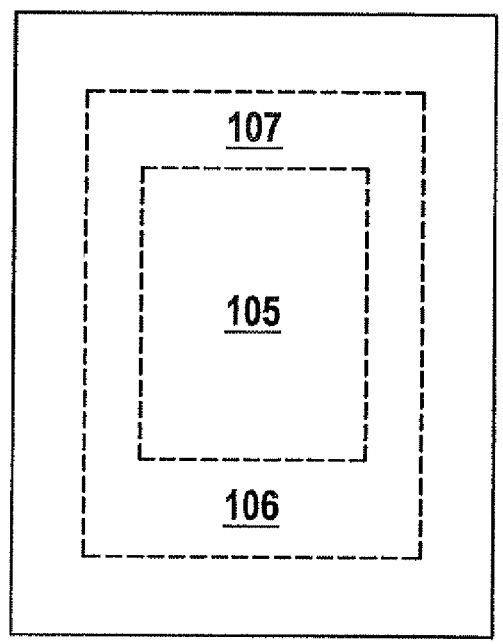
FIG. 1d shows another view of an air pressure sensor according to the present invention.

FIG. 1d shows a top view of the sensor housing cover. Again, the elements of the base cover are depicted by solid lines and the silicone parts by dashed lines. Pressure inlet fitting or channel 105 and sections 106 and 107 which lead through hole 102 and 101 to produce the positive connection are shown.

Figure 2:
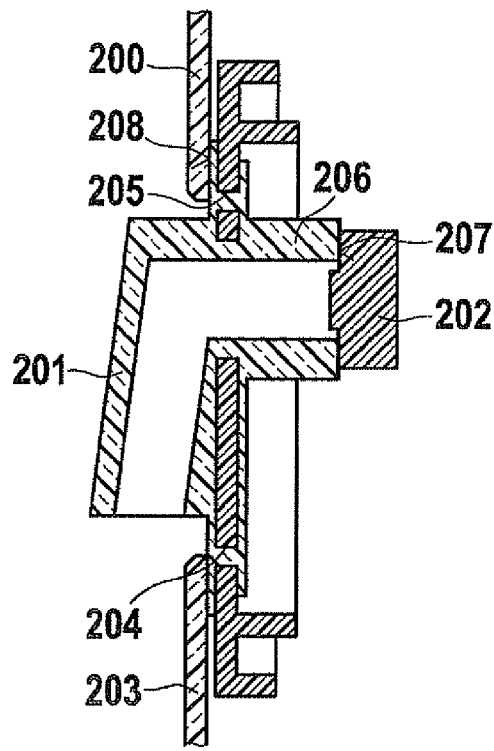
FIG. 2 shows a sectional representation of the installed air pressure sensor.

FIG. 2 shows a cross section of the sensor housing cover according to the present invention in combination with the door mounting plate and the sensor element. The door mounting plate is depicted by elements 200 and 203; the silicone and the base cover are depicted by hatching as in FIG. 1c. Sensor module 202 is depicted by close hatching and closes pressure inlet channel 201. Sealing surfaces 207 and 208 are produced by sealing or pressing. The positive connection is achieved by the silicone flowing through holes 204 and 205. The pressure inlet fitting is shown here as leading outward laterally into the wet chamber of the door. The additional part of pressure inlet channel 206 is routed in the dry chamber.

This design makes it clear that a first slide is introduced through pressure inlet channel 206 and a second slide is introduced through part 201 leading to the side in order to define this pressure inlet channel in the injection molding process. The slides will then meet accordingly on the transition of the angling.

Figure 3:
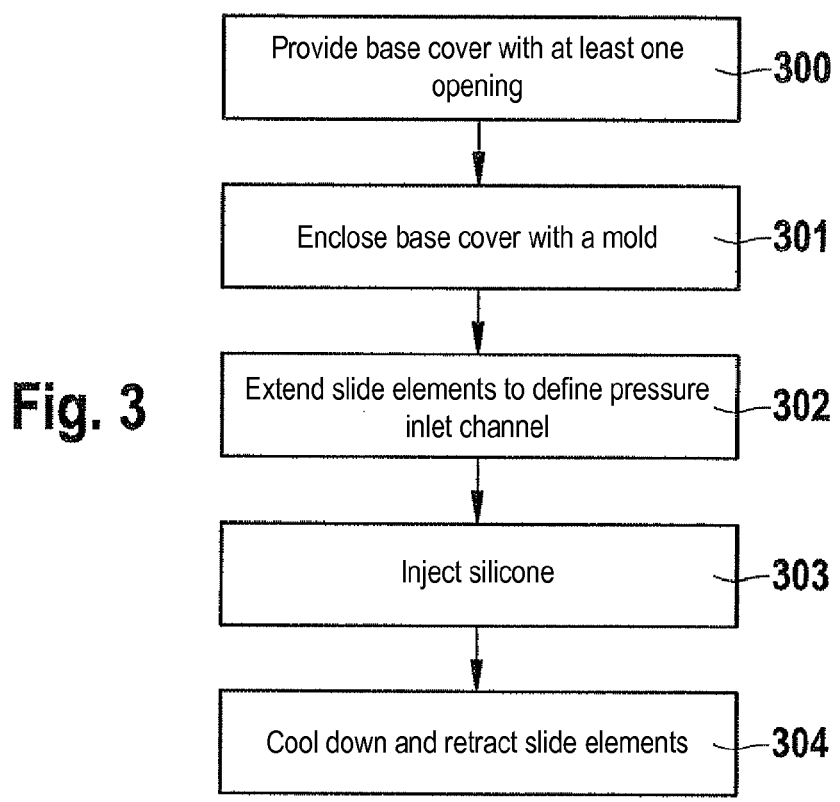
FIG. 3 shows a flow chart of the method according to the present invention.

FIG. 3 shows the method for manufacturing the sensor housing cover in a flow chart. In method step 300, the base cover is provided with at least one opening, it also being possible for the term "providing" to mean manufacturing. It is possible that, as shown in FIGS. 1 and 2, more than one opening is present in order to make an improved positive connection possible, i.e., the silicone adhering to the base cover.

In method step 301, the base cover is enclosed by a two-piece mold, specifically a top and a bottom mold. These molds are sealed so as not to leak. The molds are necessary to bring about the elements as the silicone is to be defined in the injection molding process.

In method step 302, slide elements are extended until they make contact in order to make it possible to define pressure inlet channel 201 and 206. This may, for example be done in the manner described above.

The silicone is injected in method step 303.

In method step 304, a cool-down period from the injection is initially provided and the slide elements or slides are then retracted. The mold is then opened and the sensor housing cover is finished.

What is claimed is:

1. A sensor housing cover, comprising:
a base cover having at least one opening, wherein:
the base cover is extrusion-coated with a first plastic so that the first plastic constitutes at least one element of the sensor housing cover and is connected to the base cover via the at least one opening;
the first plastic forms sidewalls of a bore that extends through the first plastic;
the at least one opening includes a first opening for a pressure inlet channel and two additional openings for the connection between the at least one element of the sensor housing cover and the base cover; and
the first opening is larger than the two additional openings.

2. The sensor housing cover of claim 1, wherein the base cover is essentially made up of a second plastic, wherein the second plastic is hydrolysis-stabilized.

3. The sensor housing cover of claim 1, wherein the base cover is a one-piece design.

4. The sensor housing cover of claim 1, wherein the first plastic is silicone.

5. The sensor housing cover of claim 1, wherein the first plastic is a one-piece configuration.

6. The sensor housing cover of claim 1, wherein the at least one element is an inner seal to a sensor.

7. The sensor housing cover of claim 1, wherein the at least one element is a pressure inlet channel.

8. The sensor housing cover of claim 1, wherein the at least one element is an external seal to a door metal plate.

9. The sensor housing cover of claim 1, wherein the sensor housing cover houses an air pressure sensor.

10. The sensor housing cover of claim 1, wherein the first plastic element includes at least one elbow through which the bore extends.

11. The sensor housing of claim 1, wherein at least part of the extrusion coating is through the at least one opening, thereby securing the first plastic to the base cover.

12. The sensor housing cover of claim 1, wherein the bore extends through the first opening.

13. A method for manufacturing a sensor housing cover, the method comprising:
providing a base cover having at least one opening;
enclosing the base cover using a mold; and
injecting a plastic into the mold for manufacturing at least one element of the sensor housing cover, the injected plastic having a connection with the base cover via the at least one opening;
wherein:
the injected plastic forms sidewalls of a bore that extends through the injected plastic;
the at least one opening includes a first opening for a pressure inlet channel and two additional openings for the connection between the at least one element of the sensor housing cover and the base cover; and the first opening is larger than the two additional openings.

14. The method of claim 13, wherein the at least part of the injection is through the at least one opening, thereby securing the plastic element to the base cover.

15. A sensor housing cover, comprising:

a base cover that is extrusion-coated with a first plastic so that the first plastic constitutes at least one element of the sensor housing cover and is connected to the base cover via two openings in the base cover that (a) each extends from a first side of the base cover through a second side of the base cover that is opposite the first side and (b) are completely filled by the first plastic;

wherein the base cover includes a further opening for a pressure inlet channel, which further opening is larger than each of the two openings.

* * * * *

UNITED STATES PATENT AND TRADEMARK OFFICE
CERTIFICATE OF CORRECTION

PATENT NO. : 8,707,783 B2  Page 1 of 1
APPLICATION NO. : 13/002130
DATED : April 29, 2014
INVENTOR(S) : Ronny Ludwig It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this
Twenty-ninth Day of September, 2015

Michelle K. Lee
*Director of the United States Patent and Trademark Office*